UNITED STATES PATENT OFFICE.

ARTHUR H. GRUBER, OF EVANSTON, ILLINOIS, ASSIGNOR OF ONE-THIRD TO EDMUND HOFFMAN, OF RACINE, WISCONSIN.

TIRE FABRIC.

1,317,701. Specification of Letters Patent. Patented Oct. 7, 1919.

Application filed August 22, 1918. Serial No. 250,970.

*To all whom it may concern:*

Be it known that I, ARTHUR H. GRUBER, a citizen of the United States, and resident of Evanston, in the county of Cook and State of Illinois, have invented certain new and useful Improvements in Tire Fabrics; and I do hereby declare that the following is a full, clear, and exact description thereof.

My invention relates to new and useful improvements in fabrics for use in the manufacture of pneumatic rubber tires and tires of similar construction.

The principal object of the invention is to provide a cheap and efficient substitute for the usual cotton or jute fabric which is used as a foundation in the carcass of rubber articles of this nature. I have discovered that paper when properly treated may be effectively used for forming fabrics for use in such art.

A still further object is to provide a strong, flexible and resilient fabric of coarse weave whereby the rubber which is used in connection with such fabric may be vulcanized between the strands thereof.

With the foregoing and other objects in view the invention resides in the novel features of construction, combination and arrangement of parts which will be hereinafter more particularly described and claimed and shown in the drawings, wherein:

Although my improved fabric is chiefly adapted for use in the manufacture of rubber tires, the same will be useful in various other lines of industry wherever it is practical to employ a light, strong and coarse woven fabric.

Figure 1:
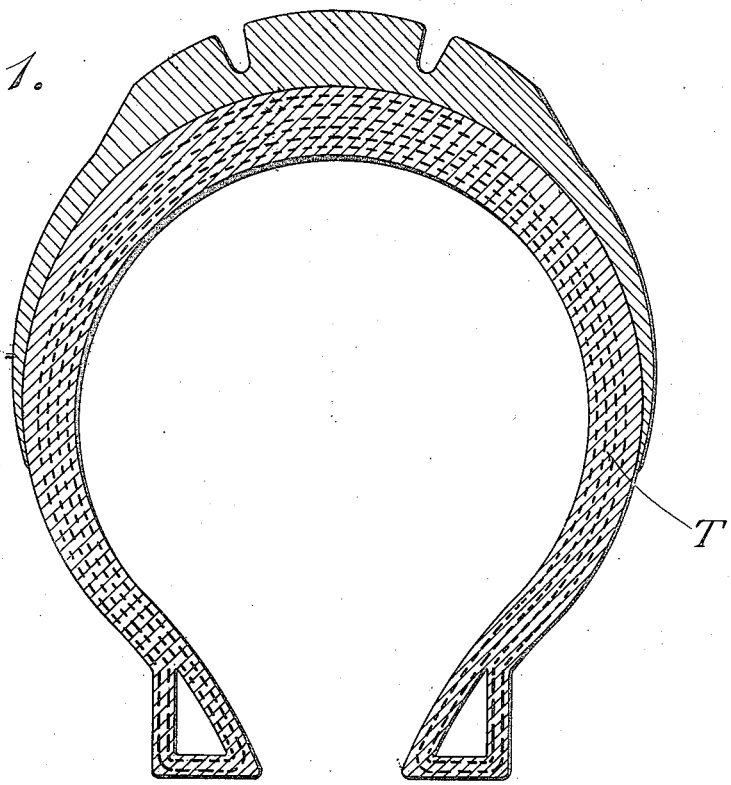
Figure 1 represents a vertical cross sectional view through a pneumatic tire casing constructed in accordance with my invention.
Figure 2:
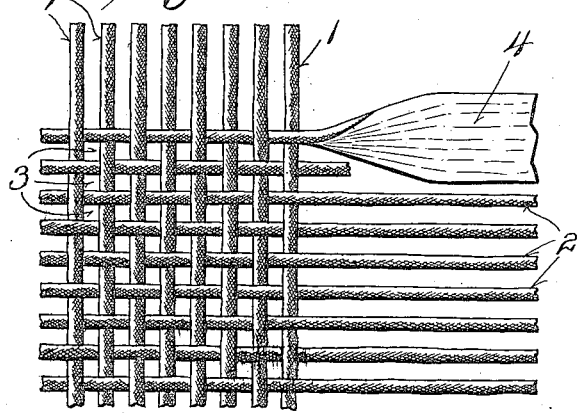
Fig. 2 is a fragmentary plan view of a portion of the fabric for use in constructing a tire such as is shown in Fig. 1.

My improved fabric is formed in the manner of the ordinary woven goods, that is to say it consists of warp and woof threads or strands 1 and 2 respectively which are disposed at right angles to each other. All the strands, especially when the fabric is to be used in the formation of rubber tires, are spaced apart whereby relatively large interstices 3 are formed between the warp and woof strands as shown in Fig. 2. Each of the strands is formed by twisting in one direction a relatively narrow elongated strip of paper, such as is shown at 4 in Fig. 2, until the same assumes a substantially circular shape in cross section.

The width of the strip of paper from which each strand is to be formed depends upon the coarseness of the finished fabric. For instance the strips of paper 4 will be relatively narrow when the fabric is to be of a fine texture. The twisting of the strips of paper may be accomplished in any preferred or desired manner and when completed the strands will be found to be of a strength out of all proportion to the untwisted strips. This strength allows the strands to be woven readily and quickly and with as much ease as the usual cotton or jute strands. Furthermore the finished fabric will be much more readily handled and although it will be slightly less flexible, it will be stronger and free of any of the usual disadvantages of the ordinary type of fabric used for the same purpose.

Figure 3:
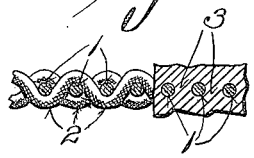
Fig. 3 is a detail sectional view through the tire fabric illustrating the manner in which the rubber vulcanizes around the strands thereof.

In building a tire T from rubber and this improved fabric the usual procedure in such cases is followed, that is to say after the fabric has been interposed between sheets of rubber assembled in the proper form, the complete formation is vulcanized. In order that the fabric and the rubber or composition may be very intimately associated, the relatively large interstices 3 are formed in the former, thus permitting the latter to vulcanize between the strands 1 and 2 as shown in Fig. 3. This prevents free movement of the fabric within the tire and also prevents the same from working loose from the surrounding rubber or composition as is frequently the case with tires constructed of the ordinary materials.

From the foregoing description taken in connection with the accompanying drawing it will be seen that an extremely inexpensive tire fabric, as well as a fabric which is very strong and flexible, may be formed of paper in the manner set forth. Such a fabric will have the ordinary characteristics of the usual loose woven cotton "cord" fabric, but may be manufactured at much less cost, and consequently the tire with which it is used will be less expensive than the so-called "cord" tire.

I claim:—

1. A tire structure comprising a fabric formed of woven strips of paper and sheets of rubber disposed at the side of said fabric and vulcanized to secure said rubber and fabric together.

2. A tire structure including a coarse fabric formed of woven strips of paper twisted to form substantially circular strands, and sheets of rubber disposed at the sides of said fabric and vulcanized to secure said rubber and fabric together.

3. A tire structure comprising fabric formed of strips of paper twisted to form substantially circular strands and woven together in spaced relation to provide interstices between the strands, and sheets of rubber disposed at the sides of the fabric and pressed into said interstices and vulcanized to secure said sheets and fabric together.

In testimony that I claim the foregoing I have hereunto set my hand at Milwaukee, in the county of Milwaukee and State of Wisconsin.

ARTHUR H. GRUBER.